June 26, 1951  G. P. SCHMITT  2,558,061
CATALYST UNIT FOR LIGHTERS
Filed May 20, 1948
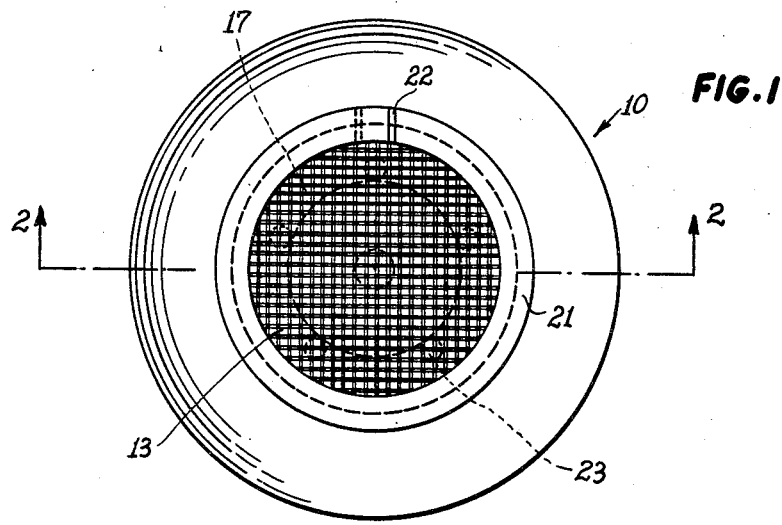
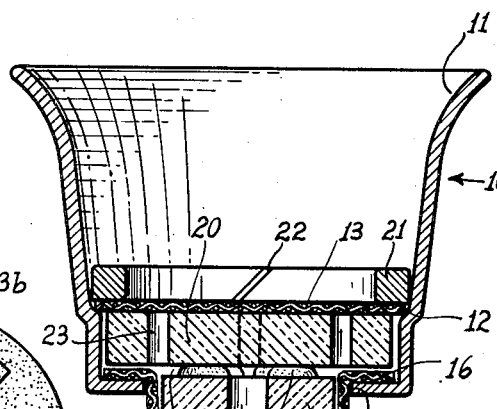
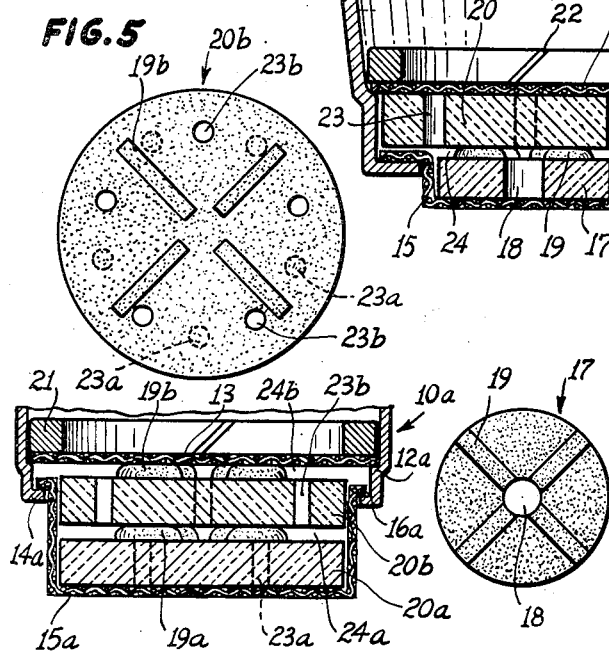
INVENTOR.
GEORGE PHILIP SCHMITT
BY 
ATTORNEY.

Patented June 26, 1951

2,558,061

UNITED STATES PATENT OFFICE 2,558,061

CATALYST UNIT FOR LIGHTERS

George Philip Schmitt, New York, N. Y., assignor to Cardinal Products Inc., New York, N. Y., a corporation of New York Application May 20, 1948, Serial No. 28,257

8 Claims. (Cl. 67—7)

The present invention relates to catalyst units for lighters of the flameless type, more particular to units of the general type disclosed, for example, in my prior United States Patents Nos. 2,286,231 and 2,291,657.

Broadly speaking, a unit of the character described comprises a head or holder preferably containing a pair of spaced-apart metal screens between which the catalyst is disposed, this catalyst being normally in the form of a disc, pill or pellet of platinum black or other suitable catalytic material having perforations which pass the vapors of the fuel to be ignited.

Other things being equal, the ignition speed of a lighter of this type will depend upon the extent of the surface area of the catalytic material which is in direct contact with the inflammable vapors. It has also been found that the provision of a single catalytic body in the form of a disc or the like will tend to localize the point of ignition at the center of the disc, thereby exposing the same to mechanical and thermal action which may lead to the early destruction of the catalyst.

In my aforesaid United States Patent No. 2,291,657 I have disclosed a catalyst unit wherein the lower of the two metal screens referred to is formed with a pocket containing granular catalytic material, this material together with the conventional pill or similar material constituting a catalyst of relatively large surface area, the granular catalytic material serving for the preheating of the fuel vapors whereby ignition of the latter will be facilitated and accelerated.

It is an object of the present invention to improve upon the arrangement just described by providing a catalyst unit in which the granular catalytic material is dispensed with and a plurality of compact catalytic members are arranged so as to give the desired distribution of the fuel vapors over a large surface area of the catalytic material.

It is another object of the invention to provide, in a unit of the character described, catalytic means forming relatively wide channels through which the vapors must pass over a circuitous route, being thus exposed to a large surface area of catalytic material.

It is a further object of the invention to provide a catalytic unit comprising a pair of compact catalytic members shaped so as to provide a vapor channel between them, whereby ignition of the fuel vapors will be facilitated and accelerated.

The above and other objects of the invention will become apparent from the following description, reference being had to the accompanying drawing in which:

Fig. 1 is a top plan view of a catalytic unit according to the invention;

Fig. 2 is a cross sectional elevation taken on line 2—2 of Fig. 1;

Fig. 3 is a top plan view of an element of the unit shown in Figs. 1 and 2;

Fig. 4 is a fragmentary view similar to Fig. 2, showing a modification of the catalytic unit according to the invention;

Fig. 5 is a top plan view of an element of the unit shown in Fig. 4; and

Fig. 6 is a modified form of holder employable in the invention.

Referring first to Figs. 1 and 2, there is shown at 10 a cup or holder which may be the detachable head of a lighter housing a fuel magazine (not shown). The cup 10 is flared at 11 and is provided with a shoulder 12 supporting the upper screen 13. The bottom of cup 10 is formed with an aperture 14 through which projects a dished central portion or pocket 15 of the lower screen 16.

Supported in the pocket 15 is a pill or pellet 17 of catalytic material, shown in top plan view in Fig. 3. The pill 17 is formed with a central aperture 18 and with four radial ribs 19 projecting above the upper surface thereof, as clearly seen in Fig. 2. A second catalytic pill 20, of substantially larger diameter, rests on the ribs 19 of pill 17 and is supported thereby between the bottom of cup 10 and the upper screen 13. A resilient retaining ring 21, which is preferably split as shown at 22, is jammed into the cup 10 above shoulder 12 to keep screen 13 and, with it, pills 17 and 20 as well as screen 16 in place.

The larger pill 20 is provided with a plurality of eccentrically located bores 23, e. g. five in number as indicated in Fig. 1. It will be understood that fuel vapors, rising toward the bottom of cup 10, pass through the screen 16 and proceed either along the periphery of pill 17 or through the central aperture 18 thereof into the space 24 which the ribs 19 provide between the catalyst elements 17 and 20. Thence the vapors may pass through the bores 23 into the interior of the holder 10, having meanwhile been ignited by the catalytic action of pills 17 and 20.

It will be understood that the arrangement of Figs. 1 and 2 may be modified by providing the ribs 19 on the upper pill 20 rather than on the lower pill 17. Again, the upper pill 20 may be provided with ribs, similar to the ribs 19, for the purpose of providing a clearance between pill 20 and screen 13 whereby the vapors may spread out over the upper face of the upper pill, thus further enhancing the catalytic action. This is shown in the modification of Fig. 4, where the lower part of a holder 10a has a shoulder 12a supporting upper screen 13 which may be identical with the corresponding screen of Fig. 2, being held in place by a retaining ring 21. The bottom of holder or cup 10a is formed with an aperture 14a which is considerably larger than aperture 14, Fig. 2, and accommodates a cup-shaped portion 15a of a screen 16a which forms a seat for two superposed pills 20a, 20b. These pills are preferably identical in structure and similar to the pill 20, Fig. 2, except for the ribs 19a, 19b formed integral with pill 20a, 20b, respectively (see also Fig. 5). Apertures 23a, 23b, which may be staggered with respect to one another as shown, are also provided in the respective pills, the relative positions of these apertures being best seen in Fig. 5 where the apertures 23a are shown in dotted lines.

Thus, by virtue of the ribs 19a, there is provided a clearance or space 24a between the pills 20a and 20b, serving the same purpose as the space 24 in Fig. 2. Similarly, by virtue of the ribs 19b, there is provided a clearance 24b between pill 20b and screen 13 for the purpose indicated above. The use of a pair of identical catalyst elements is advantageous for purposes of tooling and standardization.

Fig. 6 discloses a modified form of cup or holder 10b for the pair of catalysts 20a and 20b of Fig. 4 and the catalyst 17 of Fig. 2. The bottom of cup 10b is formed with an aperture through which projects the dished central portion or pocket 15a of the lower screen 16a in which is supported the pellet 17 of Fig. 2.

Thus it will be appreciated that the invention provides a catalyst unit which will be rapid and dependable in operation, by virtue of the large area of contact between the fuel vapors and the catalytic material, and which will therefore insure rapid incandescence even where a lighter is cold or has not been used for a long time. It is to be understood, however, that the invention is not limited to the precise embodiments described and illustrated, and that various modifications and adaptations fall within the scope thereof as defined in the appended claims.

I claim:

1. A catalyst unit for a lighter employing vaporizable fuel, comprising a cup-shaped member, the bottom of said member being provided with an aperture, a first screen having a dished portion, said portion projecting outward from said member through said aperture, a first catalyst element held in said portion, a second catalyst element adjacent said first element, at least one of said elements having a projection holding said elements apart whereby a vapor space is formed, a second screen adjacent said second element, said elements being arranged to permit the passage of vapors from the exterior into the interior of said member by way of said screens and said vapor space, and retaining means holding said screens and said elements in place.

2. A catalyst unit according to claim 1 wherein each of said elements is provided with at least one perforation communicating with said vapor space.

3. A catalyst unit according to claim 2 wherein said first element is a disc provided with a center bore and said second element is a disc provided with a plurality of bores eccentrically arranged.

4. A catalyst unit according to claim 1 wherein said second element is provided with a projection holding said second element and said second screen apart whereby a further vapor space is formed.

5. A catalyst unit for a lighter employing vaporizable fuel, comprising a cup-shaped member, the bottom of said member being provided with a central aperture, a first screen having a dished center portion open at the top and projecting downward through said aperture, a first perforated disc of catalytic material held in said portion, said disc being provided with a plurality of radially extending ribs projecting from the upper face thereof, a second perforated disc supported on said ribs whereby a vapor space is formed between said two discs, a second screen above said second disc, and a retaining ring engaging the inner wall of said member above said second screen to hold said screens and said discs in place, said screens, said vapor space and the perforations of said discs forming a circuitous path for ignitable fuel vapors passing from below said member into the interior thereof.

6. A catalyst unit according to claim 5 wherein said second disc is supported above said first screen and projects beyond the dished portion thereof.

7. A catalyst unit for a lighter employing vaporizable fuel, comprising a cup-shaped member, the bottom of said member being provided with an aperture, a first screen having a dished portion, said portion projecting outward from said member through said aperture, a plurality of superposed catalyst elements including a first element held in said portion and a second element adjacent said first element, at least one of said elements having a projection holding said elements apart whereby a vapor space is formed, a second screen adjacent the uppermost of said catalyst elements, said elements being arranged to permit the passage of vapors from the exterior into the interior of said member by way of said screens and said vapor space, and retaining means holding said screen and said elements in place.

8. A catalyst unit according to claim 7 wherein said uppermost element is provided with a projection spacing it from said second screen, thus forming a second vapor space.

GEORGE PHILIP SCHMITT.

REFERENCES CITED

The following references are of record in the file of this patent:

UNITED STATES PATENTS

| Number | Name | Date |
| --- | --- | --- |
| 1,400,204 | Backhaus | Dec. 13, 1921 |
| 1,937,097 | Schmitt | Nov. 28, 1933 |
| 2,291,657 | Schmitt | Aug. 4, 1942 |
| 2,356,356 | Schmitt | Aug. 22, 1944 |
| 2,493,266 | Schmitt | Jan. 3, 1950 |